Aug. 3, 1948.    O. L. BRANSON    2,446,456
SALT DEPOSITION
Filed April 3, 1947
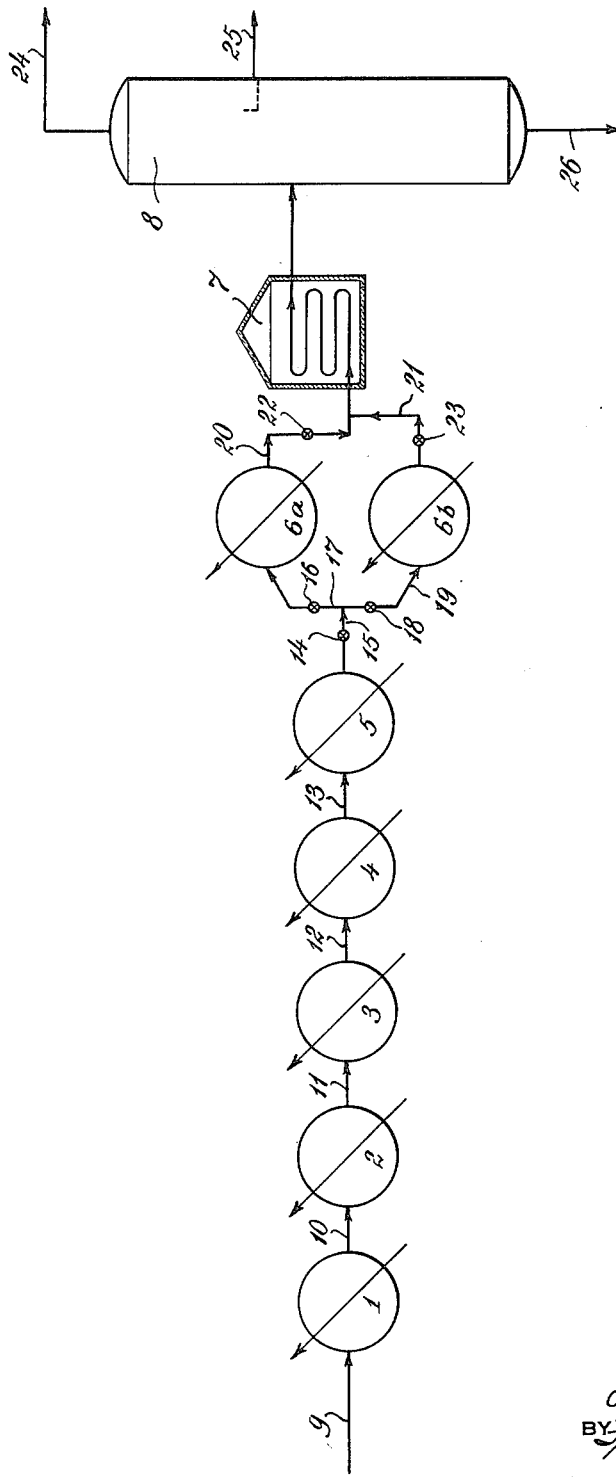
INVENTOR
OTIS L. BRANSON
BY Francis F. Johnston
AGENT OR ATTORNEY Patented Aug. 3, 1948

2,446,456

UNITED STATES PATENT OFFICE 2,446,456

SALT DEPOSITION

Otis L. Branson, Beaumont, Tex., assignor to Socony-Vacuum Oil Company, Incorporated, New York, N. Y., a corporation of New York Application April 3, 1947, Serial No. 739,173

2 Claims. (Cl. 252—346)

The present invention relates to the treatment of crude oil for the recovery of valuable components thereof and, more particularly, to the treatment of crude petroleum for the removal of salts with which the crude petroleum is associated.

The petroleum industry has recognized for many years that lakes of petroleum are located near salt domes. In fact, the association of crude petroleum and salts such as the chlorides and sulfates of sodium, magnesium and calcium is so close that many crudes carry relatively large amounts of such salts. For example, crudes carrying as much as about 300 pounds of salt per thousand barrels of oil and crudes contaminated with as little as 30 pounds of salt per thousand barrels of oil have been encountered in the everyday operations of the industry.

The connate salt is usually held by the crude petroleum in the form of an aqueous solution dispersed throughout the body of oil in the form of small droplets. When the emulsion of saline solution in oil is heated to temperatures at which the water of the emulsion evaporates, the water vaporizes leaving the salt as solid particles which deposit in pipelines, heat exchangers and the like, producing an undesirable pressure drop across the piece of equipment so contaminated. The effect in heat exchangers is particularly undesirable because the coating of salt reduces the effectiveness of the heat exchanger as a means transferring heat from the hot oil to another stream to be heated. Furthermore, the deposits of salt tend to segregate in particular pieces of equipment and eventually the heat exchanger, etc. must be withdrawn from service for an overhaul including removal of the deposited salt.

The industry has recognized this problem and from time to time various solutions, more or less satisfactory, have been proposed. However, most if not all, of the previously proposed solutions to the problem of desalting crude oil, and especially crude petroleum, have involved the use of rather a complicated combination of additional equipment or the use of special chemicals or special devices.

An example of the use of special equipment for desalting petroleum oil or, in general, removing saline material and other impurities from mineral oil is the method disclosed in U. S. Patent No. 2,404,405. The method there described includes adding relatively fresh water to the oil and mixing the added water and oil to form an oil-continuous dispersion containing the relatively fresh water in the form of droplets. Later additional relatively fresh water is mixed with the dispersion in such a manner as to distribute the later-added water in droplets of an average size different from the droplets of the first-added water. Thereafter the emulsion is subjected to the action of an electric field to coalesce the water to form coalesced masses of impurities, i.e. salts, etc., from the oil and the coalesced masses separated from the oil.

Illustrative of another suggested solution to the problem of desalting mineral oil is that described in U. S. Patent No. 2,410,970. This method involves placing the oil under pressure, adding water and a gas such as propane, mixing the oil, water and gas together, heating the mixture, ejecting the mixture under water into a region under sufficiently reduced pressure to permit formation of bubbles of gas and then separating the oil from the water and gas.

Another method of desalting crude petroleum involves treating the oil with liquid anhydrous hydrogen fluoride for a period of time sufficient to convert the chlorides to fluorides and removing the more insoluble fluorides The desalting of crude petroleum using hydrogen fluoride is further illustrated in U. S. Patent No. 2,400,986. In this method the crude oil is contacted with an aqueous solution of hydrogen fluoride, the mixture is stratified and the oil phase substantially free from water and salts is separated from the aqueous hydrogen fluoride phase containing the salts in the form of fluorides.

In the September, 1946, issue of the Petroleum Refiner there is described a method of treating crude oil containing salt. This method consists essentially of mixing a small amount of water with the crude, heating the mixture to about 230 degrees Fahrenheit, passing the heated mixture through a single bed or a series of beds of excelsior or fiberglass to collect the droplets of water on the surface of the excelsior or fiberglass and settling the effluent from the bed under a pressure sufficient to prevent vaporization.

It will be recognized that each of the methods of desalting mineral oil briefly outlined hereinbefore involves the use of special chemicals, i. e. anhydrous or aqueous hydrogen fluoride with its attendant hazards or special or additional equipment such as a modified Cottrell unit or a coalescer. However, the earlier approaches to the solution of the problem of desalting mineral oil were much simpler.

Thus, in U. S. Patent No. 2,221,518 a method of desalting petroleum is described which only requires an enlarged zone for separation of the salt.

This method comprises heating a salt-free petroleum materially, mixing under pressure a stream of the heated petroleum with a stream of petroleum containing water and salt, the heated stream contributing sufficient heat to raise the temperature of the water- and salt-bearing petroleum above the vaporization temperature of its water-content at reduced pressure. The heated water- and salt-bearing petroleum together with the water- and salt-free petroleum is then discharged into a zone of sufficient capacity that the pressure is reduced sufficiently to vaporize the water present and in an enlarged zone separating the crystallized salt from the petroleum by gravity.

This latter method of desalting petroleum is relatively simple but nevertheless requires additional equipment. On the other hand, it has now been discovered that satisfactory desalting of crude petroleum can be obtained without the addition of any equipment to the conventional equipment usual in use in most refineries or the use of special chemicals.

Illustrative of the simplicity of this novel method is the desalting of a crude in a system involving a plurality of heat exchangers and a furnace. Prior to the present discovery salt deposition had taken place wherever the temperature of the crude was about 250 degrees Fahrenheit or higher. As a consequence, salt deposition occurred in a number of the heat exchangers and the furnace. However, it has been found that by critical control of temperature and pressure the deposition of the salt can be localized in one of two, preferably alternately used, heat exchangers and the remainder of the system kept substantially free from salt. Thus, by the maintenance of crucial temperatures and pressures and without the use of special chemicals or special equipment, petroleum can be desalted to a satisfactory point.

In the drawing a conventional grouping of common refinery equipment for the topping of crude petroleum is illustrated in a more or less diagrammatic manner. A plurality of heat exchangers are indicated by 1, 2, 3, 4, 5, 6a and 6b. Crude oil to be topped and further treated passes through a plurality of heat exchangers which may be more than seven in number and during the passage therethrough is heated by indirect heat exchange to a temperature above 250 degrees Fahrenheit. Prior to the present discovery the crude oil had been passed through eleven heat exchangers such as illustrated by 1—6a and 6b before entrance into furnace 7. The first nine exchangers had a crude outlet temperature of about 370 degrees Fahrenheit at a pressure of about 250 pounds per square inch gauge (p. s. i. g.). Under these conditions of temperature and pressure salt was deposited in all of the first nine heat exchangers. As a consequence of the deposition of salt in the first nine exchangers, the pressure drop across these nine pre-heat exchangers increased from 70 to 170 pounds per square inch (p. s. i.) in about seventeen days when treating a crude averaging 85 pounds of salt per 1000 barrels. During a period of 7 days when treating a crude containing 95 pounds of salt per 1000 barrels, the pressure drop across the pre-heat exchangers increased from 55 to 195 pounds per square inch.

On the other hand, when the temperature and pressure were controlled within critical limits as set forth hereinafter a crude containing an average of 85 pounds of salt per 1000 barrels was treated during a 31 day period and the pressure drop across the pre-heat exchangers did not vary more than about 5 p. s. i. for the entire 31 day period. During a subsequent period of about 90 days when treating crudes of similar salt content, there was no noticeable build-up due to salt deposition. In view of the foregoing, it is manifest that a remarkable improvement in operating conditions accompanied by a reduction in operating costs results from applying the principles of the present invention to the treatment of oils containing salt.

The principles of the present invention are best illustrated by reference to the drawing. Petroleum oil or fractions thereof containing an undesirable amount of salt, for example, crude petroleum, in line 9 enters pre-heat exchanger 1 and passes successively through line 10, exchanger 2, line 11, exchanger 3, line 12, exchanger 4, line 13 and exchanger 5. While passing through heat exchangers 1 to 5 the temperature of the oil is raised by indirect heat exchange using any medium, for example hot oil, while maintaining an outlet pressure of at least 350 p. s. i. g. at the outlet of the last pre-heat exchanger, i. e. exchanger 5. For this purpose a valve 14 is placed in outlet line 15 of exchanger 5. When pressures less than 350 p. s. i. g. are maintained in the pre-heat exchangers, salt is deposited in all of the pre-heat exchangers to an extent requiring a shut-down followed by cleaning of all the pre-heat exchangers. When a pressure greater than 350 p. s. i. g. but less than 700 p. s. i. g. is maintained in the pre-heat exchangers, substantially no salt is deposited in the pre-heat exchangers 1 to 5.

The oil issuing from the last pre-heat exchanger has a temperature of about 370 degrees Fahrenheit. In order that no on-stream time shall be lost, it is preferred to provide two heat exchangers 6a and 6b in which the temperature of the oil is raised from about 370 to about 450 degrees Fahrenheit. In passing through valve 14 the pressure on the oil is reduced from 375 p. s. i. g. at the outlet of the last pre-heat exchanger (5 in the drawing) to about 285 p. s. i. g. at the inlet of exchanger 6a or 6b. In passing through exchanger 6a or 6b the pressure is further reduced to about 200 p. s. i. g. at the outlet of exchanger 6a or 6b. Those skilled in the art will understand that the oil passes from the last pre-heat exchanger to exchangers 6a and 6b through lines 15, 17 and 19; the direction of flow being controlled by valve 16 in line 17 and valve 18 in line 19. While the salt deposited in one of the exchangers 6a or 6b is being removed the other exchanger is used to localize the deposition of salt without loss of on-stream time. Of course, one exchanger can be used to accumulate the salt and the operation shut-down while the accumulated salt is being removed. The essential conditions involve maintaining a pressure in excess of 350 p. s. i. g. on the salt-bearing oil except in the specific piece of equipment wherein the localized deposition of salt is to take place. In that zone of localized deposition of salt the temperature is raised and the pressure reduced sufficiently to cause vaporization of the water present in the oil and deposition of the salt.

After passing through the zone of localized salt deposition the oil is then processed in any conventional manner. The operation illustrated in the drawing is that of the treatment of a crude. The oil after passing through the zone of localized salt deposition 6a or 6b passes through lines 20 or 21 under control of valves 22 and 23 to furnace 7 wherein it is heated to the desired temperature. A fractionation tower 8 is operated in a conventional manner to provide the desired products which may be, for example, overhead naphtha withdrawn through 24, gas oil withdrawn through 25 and bottoms withdrawn through 26.

In general, the present invention provides for heating by indirect heat-exchange a salt- and water-bearing oil to desired temperatures under a pressure of at least 350 p. s. i. g. and not greater than the crucial pressure for the temperature. Thereafter, the oil is introduced into a zone of localized salt formation at a reduced pressure of less than 350 p. s. i. g. and the temperature raised to that at which the salt is deposited and the water vaporized. Thereafter the desalted oil is treated in any conventional manner required by the desired end product or products.

I claim:

1. A method for de-salting water- and salt-bearing oils which comprises heating a water- and salt-bearing oil at a pressure of about 350 p. s. i. g. to about 700 p. s. i. g., to a temperature of at least 370° F. but not equal to that temperature at which water vaporizes at the existing pressure, reducing the pressure on said oil to about 200 p. s. i. g. and raising the temperature of said oil to a temperature at which water vaporizes at said pressure and salt is deposited.

2. A method for de-salting water- and salt-bearing oils which comprises heating a water- and salt-bearing oil to a temperature of about 370° F. whilst at a pressure of 350 to 700 p. s. i. g., reducing the pressure on said oil to about 285 p. s. i. g. whilst raising the temperature of said oil to about 450° F. and reducing the pressure finally to about 200 p. s. i. g. whereby water is vaporized and salt is deposited.

OTIS L. BRANSON.

REFERENCES CITED

The following references are of record in the file of this patent:

UNITED STATES PATENTS

| Number | Name | Date |
| --- | --- | --- |
| 1,833,618 | Pew | Nov. 24, 1931 |
| 1,928,282 | Elliott | Sept. 26, 1933 |
| 2,194,269 | Rogerson | Mar. 19, 1940 |
| 2,195,833 | Wirth | Apr. 2, 1940 |
| 2,221,518 | Jennings | Nov. 12, 1940 |
| 2,302,916 | Skinner | Nov. 24, 1942 |
| 2,319,188 | Mellett | May 11, 1943 |